Patented Mar. 24, 1925.

1,530,823

UNITED STATES PATENT OFFICE.

DONALD GRANT, OF LITHERLAND, ENGLAND, ASSIGNOR TO KLARIT LIMITED, OF LITHERLAND, LIVERPOOL, ENGLAND.

DECOLORIZING AND PURIFYING SUGAR AND OTHER CRYSTALLINE OR GRANULAR SUBSTANCES.

No Drawing. Application filed February 17, 1920. Serial No. 359,324.

*To all whom it may concern:*

Be it known that I, DONALD GRANT, subject of the King of Great Britain, residing in Litherland, in the county of Lancaster and Kingdom of England, have invented certain new and useful Improvements in Decolorizing and Purifying Sugar and Other Crystalline or Granular Substances, of which the following is a specification.

In the refining of raw or impure sugar and other substances it has hitherto been the custom to form syrups or solutions and then to purify and decolorize them by means of animal charcoal or other decolorizing agents, or by means of both. But since only a part of the impurities contained in such unrefined or coloured sugar (or in other impure crystalline substances) is occluded in the crystals themselves, while the greater proportion is present in a liquid which adheres to their surfaces, it is evident that in decolorizing and purifying them a far more satisfactory result will be obtained if this adhering liquid is removed and treated separately, than if the whole mass of crystals and adhering liquid is first dissolved in water. It is, however, difficult to remove this liquid without dissolving part of the crystals.

I have discovered that the liquid adhering to the crystals and the impurities it contains, can be treated in situ by mixing the dry impure sugar (or other crystalline substance) with dry kieselguhr, active carbon, or other finely-divided solid agent. On subsequent solution much of the colouring matter and impurities remains attached to the kieselguhr and carbon, and little is dissolved except pure sugar (or other crystalline substance).

My invention thus consists in mixing the impure crystals or grains of sugar (or other material) in solid form with a finly-divided solid substance having absorptive properties, for instance kieselguhr or active carbon (whether of animal or vegetable origin) or both.

The two materials—impure sugar (or other impure solid) and the absorptive substance—appear to form an intimate mixture which, being dry and mobile but not dusty, can be much more easily handled and transported than either of its constituents, does not deteriorate owing to the action of micro-organisms, and on subsequent treatment yields readily a very pure sugar (or other product).

This subsequent treatment may consist of one or both of the following methods: (1) removing the absorptive or decolorizing substance, or both, from the mixture by mechanical means: for example by washing the mixture in a centrifugal machine or tank with a solution of pure or impure sugar (or of the substance under treatment) or with any other liquid: or (2) treating the mixture with water which may be acidified (or with some other suitable solvent) with or without heat and then filtering, when a purified solution is obtained, the absorptive substance or substances containing active carbon seizing the gummy constituents and other impurities (such as colouring matter) and preventing them from passing into solution.

When active carbon is used in this manner a much smaller percentage is necessary than when the decolorizing agent is brought into contact with syrups or solutions in which the impurities have already assumed liquid form and considerable time is saved. Further, with both absorptive substances such as kieselguhr, and with decolorizing agents such as active carbon, subsequent mechanical filtration is very greatly facilitated since, especially in the case of syrups, the viscosity due to impurities is much reduced.

Among the advantages which I expect to get by this method of using absorptive substances and filtering media are the following:

(1) *Mobility.*—The substance treated, for instance impure sugar, becomes as mobile as sand and does not adhere to the surface of conveyors, elevators or sieves owing to the fact that the sugar particles are covered or coated. It can thus be shipped like grain without sacks and discharged by pneumatic elevators.

(2) *Permanence.*—The substance is protected from the deleterious activity of micro-organisms and in the case of sugar from inversion. It can thus be stored for long periods in warehouses or ships without deterioration.

(3) *Filtration.*—Owing to the retention of impurities by the absorptive material, whether kieselguhr or active carbon, or other matter, the solutions made from substances so treated are easy to filter.

(4) *Decolouration.*—When active carbon is used, it is brought at once into contact with the dense syrup adhering to the crystals of sugar (or other substance) acting on and absorbing the colouring matter, most of which is contained in this syrup, before it has become diffused by the solution of the crystals. Thus the process of decolouration is more efficient and economical than when solution precedes the application of active charcoal.

With regard to quantities, I have found the following useful:

Say from one-half to six parts of vegetable or animal charcoal, or from one-half to six parts of kieselguhr, to every hundred parts of raw or incompletely refined sugar, or an addition of both absorbents (in any ratio) which gives a total of from one-half to six per cent of the weight of the mixture, the amount depending on the nature of the raw or incompletely refined material. The correct amount of absorbent substances, such as carbon or kieselguhr (or the mixture of both in any ratio), is that proportion which gives, with the particular material under treatment, a dry product without dust. It varies from one-half to six per cent., according to the amount and nature of the impurities present.

By the term active or activated carbon, I refer to carbon, e. g., animal or vegetable charcoal which has been activated chemically either during or after carbonization, e. g., by gas activation or otherwise as distinct from mere physical activation by heat or carbonization. See Thorpe's Dictionary of Applied Chemistry, Vol. 2, 1921, page 484, under the heading "Decolourizing carbons". The material must be used in pulverulent form.

I claim as my invention.—

1. The process of treating impure solid sugar which comprises mixing it with powdered activated carbon in sufficient quantity to make the mixture non-sticky.

2. The process of refining impure sugar which consists in mixing the solid impure sugar with activated carbon in powdered form, dissolving the sugar in water and separating the solution from the carbon and impurities.

3. As a new product, a non-sticky mixture of grains of solid sugar and powdered activated carbon adhering to the surfaces of its granules.

4. As a new product a dry granular material consisting of a mixture of solid sugar and activated carbon adhering to and covering the surface of the granules.

5. As a new product, solid granules of sugar in which the crystals possess a closely adhering non-sticky surface coating of activated carbon.

6. The process of refining impure sugar which consists in mixing the solid granular impure sugar with finely divided activated carbon, then dissolving the sugar in acidulated water and separating the solution from the carbon and impurities whereby much less carbon is required than with the ordinary process.

In witness whereof, I have hereunto signed my name this 27th day of January 1920, in the presence of two subscribing witnesses.

DONALD GRANT.

Witnesses:
THOMAS MEUGUS LINGARD,
HAROLD MOORSE.